United States Patent
Lee et al.

(10) Patent No.: US 10,586,362 B2
(45) Date of Patent: Mar. 10, 2020

(54) INTERACTIVE LAYOUT-AWARE CONSTRUCTION OF BESPOKE CHARTS

(71) Applicant: Microsoft Technology Licensing, LLC, Redmond, WA (US)

(72) Inventors: Bongshin Lee, Issaquah, WA (US); Matthew Michael Brehmer, Seattle, WA (US); Donghao Ren, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/011,592

(22) Filed: Jun. 18, 2018

(65) Prior Publication Data

US 2019/0385348 A1    Dec. 19, 2019

(51) Int. Cl.
| | |
|---|---|
| *G06F 17/00* | (2019.01) |
| *G06T 11/60* | (2006.01) |
| *G06F 17/24* | (2006.01) |
| *G06F 3/0482* | (2013.01) |
| *G06F 3/0486* | (2013.01) |
| *G06F 3/0481* | (2013.01) |

(52) U.S. Cl.
CPC ............ *G06T 11/60* (2013.01); *G06F 3/0482* (2013.01); *G06F 3/0486* (2013.01); *G06F 3/04817* (2013.01); *G06F 17/247* (2013.01); *G06F 17/248* (2013.01)

(58) Field of Classification Search
CPC .... G06F 17/248; G06F 17/247; G06F 3/0482; G06F 3/04817; G06T 11/60
See application file for complete search history.

(56) References Cited

U.S. PATENT DOCUMENTS

| | | | | |
|---|---|---|---|---|
| 5,980,096 A | * | 11/1999 | Thalhammer-Reyero | ................... G05B 17/02 |
| 7,667,582 B1 | * | 2/2010 | Waldorf | ................ G06T 11/206 340/440 |
| 8,554,486 B2 | * | 10/2013 | Lurie | ....................... G16B 5/00 702/19 |

(Continued)

OTHER PUBLICATIONS

"Builder: Intuitive Analysis for Predicting Key Insights", Retrieved From <<https://web.archive.org/web/20170126045744/https:/carto.com/builder/>>, Jan. 26, 2017, 8 Pages.

(Continued)

*Primary Examiner* — Laurie A Ries
(74) *Attorney, Agent, or Firm* — Newport IP, LLC; Michael C. Johnson; Leonard Hope (57) ABSTRACT

A chart creation tool is provided that operatively, specifies chart layouts interactively in lieu of programmatically specifying data transformations. Operatively, the herein described systems and methods can convert user-specified layouts into mathematical constraints, and a constraint solver is employed to draw the resulting chart. An illustrative user interface is provided that can allow a user to input data representative of one or more chart layouts through the interaction with one or more illustrative controls of the user interface. Responsive to such interactions (i.e., data input), one or more mathematical constraints can be calculated/generated from the inputted user-specified one or more chart layout input data. Illustratively, the chart layout can comprise a reusable layout.

18 Claims, 9 Drawing Sheets

(56) References Cited

U.S. PATENT DOCUMENTS

| | | | |
|---|---|---|---|
| 9,471,152 B2* | 10/2016 | Ho | G06F 16/9038 |
| 9,613,086 B1 | 4/2017 | Sherman | |
| 10,331,720 B2* | 6/2019 | Neels | G06F 16/338 |
| 2004/0230508 A1* | 11/2004 | Minnis, Jr. | G06Q 10/10 |
| | | | 705/35 |
| 2005/0060647 A1* | 3/2005 | Doan | G06F 16/248 |
| | | | 715/205 |
| 2005/0096950 A1* | 5/2005 | Caplan | G06Q 10/06314 |
| | | | 705/7.24 |
| 2005/0198042 A1* | 9/2005 | Davis | G06F 17/2247 |
| 2006/0062469 A1* | 3/2006 | Li | G06K 9/222 |
| | | | 382/186 |
| 2008/0201269 A1* | 8/2008 | Hollins | G06Q 40/00 |
| | | | 705/36 R |
| 2009/0018996 A1* | 1/2009 | Hunt | G06Q 30/02 |
| 2011/0261049 A1* | 10/2011 | Cardno | G06Q 10/10 |
| | | | 345/419 |
| 2013/0103615 A1* | 4/2013 | Mun | G06Q 40/06 |
| | | | 705/36 R |
| 2013/0124265 A1* | 5/2013 | Whitehair | G06Q 10/06 |
| | | | 705/7.36 |
| 2013/0167002 A1* | 6/2013 | Ludwig | G06F 17/246 |
| | | | 715/215 |
| 2015/0012330 A1* | 1/2015 | Sugiura | G06Q 10/06316 |
| | | | 705/7.26 |
| 2015/0067568 A1* | 3/2015 | Lee | G06F 3/04842 |
| | | | 715/771 |
| 2015/0261728 A1* | 9/2015 | Davis | G06F 16/93 |
| | | | 715/234 |
| 2016/0155249 A1* | 6/2016 | Moore | G06T 11/206 |
| | | | 715/227 |
| 2017/0262425 A1* | 9/2017 | Ludwig | G06F 17/246 |
| 2017/0315979 A1* | 11/2017 | Boucher | G06F 7/544 |
| 2018/0165851 A1* | 6/2018 | Apte | G06T 11/60 |

OTHER PUBLICATIONS

"ConstraintLayout", Retrieved From <<https://developer.android.com/reference/android/support/constraint/constraintLayout.html>>, Retrieved on: Jan. 2, 2018, 19 Pages.

"Content Management System for data visualizations", Retrieved From <<http://datamatic.io/>>, Retrieved on: Jan. 2, 2018, 40 Pages.

"How to create a chart", Retrieved From <<https://web.archive.org/web/20130812212750/https:/ubiq.co/tutorials/how-to-create-chart>>, Aug. 12, 2013, 4 Pages.

"Sankey Diagram", Retrieved From <<https://web.archive.org/web/20140210140428/https:/developers.google.com/chart/interactive/docs/gallery/sankey>>, Feb. 10, 2014, 11 Pages.

Badros, et al., "The Cassowary Linear Arithmetic Constraint Solving Algorithm", In Journal of ACM Transactions on Computer-Human Interaction, vol. 8, Issue 4, Dec. 2001, pp. 267-306.

Bigelow, et al., "Iterating between Tools to Create and Edit Visualizations", In Journal of IEEE Transactions on Visualization and Computer Graphics, vol. 23, Issue 1, Jan. 2017, 10 Pages.

Bostock, et al., "D3 Data-Driven Documents", In Journal of IEEE Transactions on Visualization and Computer Graphics, vol. 17, Issue 12, Dec. 2011, pp. 2301-2309.

Bostock, et al., "Protovis: A graphical toolkit for visualization", In Journal of IEEE Transactions on Visualization and Computer Graphics, vol. 15, No. 6, Nov. 2009, pp. 1121-1128.

Cofsky, Amanda, "Quickly create infographics with the infographic designer custom visual for Power BI", Retrieved From <<https://powerbi.microsoft.com/en-us/blog/quickly-create-infographics-with-the-infographic-designer-custom-visual-for-power-bi/>>, Oct. 26, 2016, 13 Pages.

Cruz, et al., "Implementation of a constraint-based visualization system", In Proceedings of IEEE International Symposium on Visual Languages, Sep. 10, 2000, pp. 13-20.

Fuchs, et al., "Evaluation of Alternative Glyph Designs for Time Series Data in a Small Multiple Setting", In Proceedings of the SIGCHI Conference on Human Factors in Computing Systems, Apr. 27, 2013, 10 Pages.

Grammel, et al., "A survey of visualization construction user interfaces", In Proceedings of Eurographics Conference on Visualization, Jun. 17, 2013, 5 Pages.

Mauri, et al., "RAWGraphs: A visualisation platform to create open outputs", In Proceedings of the 12th Biannual Conference on Italian SIGCHI Chapter, Sep. 18, 2017, 5 Pages.

Moloney, et al., "Constraint technology for user-interface construction in ThingLab II", In Proceedings of Object-Oriented Programming Systems, Languages and Applications, vol. 24, Oct. 1989.

Reas, et al., "Processing: Programming for the media arts", In Journal of AI & Society, vol. 20, Issue 4, Sep. 2006, pp. 526-538.

Ren, et al., "iVisDesigner: Expressive interactive design of information visualizations", In Journal of IEEE Transactions on Visualization and Computer Graphics, vol. 20, Issue 12, Dec. 2014, pp. 2092-2101.

Ryall, et al., "An interactive constraint-based system for drawing graphs", In Proceedings of the 10th annual ACM symposium on User interface software and technology, Oct. 14, 1997, pp. 97-104.

Satyanarayan, et al., "Lyra: An interactive visualization design environment", In Proceedings of the 16th Eurographics Conference on Visualization, vol. 33, No. 3, Jun. 9, 2014, 10 Pages.

Satyanarayan, et al., "Reactive Vega: A streaming dataflow architecture for declarative interactive visualization", In Journal of IEEE Transactions on Visualization and Computer Graphics, vol. 22, Issue 1, Jan. 31, 2016, 10 Pages.

Satyanarayan, et al., "Vega-Lite: A grammar of interactive graphics", In Journal of IEEE Transactions on Visualization and Computer Graphics, vol. 23, Issue 1, Jan. 2017, 10 Pages.

Shewchuk, Jonathan Richard, "An Introduction to the Conjugate Gradient Method without the Agonizing Pain", In Technical Report of Carnegie Mellon University, Aug. 4, 1994, pp. 1-17.

Sleeper, Ryan, "Tableau 201: How to Make a Dual-Axis Combo Chart", Retrieved From <<https://www.evolytics.com/blog/tableau-201-how-to-make-a-dual-axis-combo-chart/>>, Jan. 18, 2016, 9 Pages.

Stolte, et al., "Polaris: A system for query, analysis, and visualization of multidimensional relational databases", In Journal of IEEE Transactions on Visualization and Computer Graphics, vol. 8, Issue 1, Jan. 2002, pp. 52-65.

Takahashi, et al., "A constraint-based approach for visualization and animation", In Journal of Constraints, vol. 3, Issue 1, Apr. 1998, pp. 1-30.

Ward, Matthew O., "A Taxonomy of Glyph Placement Strategies for Multidimensional Data Visualization", In Journal of Information Visualization, vol. 1, Issue 3/4, Dec. 2002, pp. 194-210.

Nickham, Hadley, "ggplot2: Elegant Graphics for Data Analysis", In Publication of Springer-Verlag, 2009, 217 Pages.

Nongsuphasawat, et al., "Voyager: Exploratory analysis via faceted browsing of visualization recommendations", In Journal of IEEE Transactions on Visualization and Computer Graphics, vol. 22, Issue 1, Jan. 31, 2016, 10 Pages.

* cited by examiner

INTERACTIVE LAYOUT-AWARE CONSTRUCTION OF BESPOKE CHARTS

BACKGROUND

Many people visualize data as a means to communicate insights about data, but existing interactive visualization tools provide a limited set of design choices for representing data, and as a result the potential to communicate a wide range of insights is reduced. The ability to create a highly customized or bespoke representation of data, one that is tailored to the specificities of the data and the insights that are to be conveyed, increases the likelihood that the message will be received, understood, and remembered by its audience. This expressiveness also gives the communicator a competitive advantage in a landscape awash in conventional charts and graphs.

Most commercial interactive charting tools ask chart authors to choose from a menu of common chart types or templates, such as bar, pie, or line charts, and they provide only superficial customization options beyond the choice of chart type. Beyond interactive charting tools, people also create charts via manual illustration or via programming. Illustration tools, such as Adobe Illustrator, are insufficient for authoring bespoke charts because they lack the ability to map multiple attributes of data to graphic elements. Meanwhile, although, programming a bespoke chart using a library such as D3.js provides chart authors with considerable control over the mapping of data to graphical marks and their layout, such approach can be tedious and is accessible only to a small population, i.e., those having advanced programming knowledge.

Recently, the prospect of creating bespoke charts via interactive authoring, with tools such as Lyra and iVisDesigner has been explored by those skilled in the art. However, these tools maintain a linear data-flow model and predominantly focus on mapping data to marks and glyphs, with little support for specifying the relationship between these elements in terms of layout. By way of example, the design of a simple bar chart is contemplated, where some aspects of the layout are independent of the data, such as a consistent horizontal spacing between bars. In a forward data-flow model, the spacing of bars in a bar chart is specified as a transformation to the position of these marks. To manipulate this and other layout specifications, a programmatic understanding of the internal workings of the tool may be required. Often, such tool specifications are pre-defined within an illustration tool and is generally open to users on a commercial/retail basis.

Furthermore, current solutions fall short and do not fully address the layout relationship between marks or glyphs and, specifically, whether and how these elements are visually linked such as by drawing edges or bands between them so as to emphasize their connectedness. Akin, to the shortcomings that exist with current graphing solutions, the ability to precisely specify visual links between graphical elements is not readily exposed to users.

A more advantageous approach considers an interactive chart authoring tool that prioritizes the articulation of chart layouts and the visual linking between marks or glyphs resulting in overall enhanced user experiences when creating bespoke charts as well as enhanced computing performance by reducing direct programmatic control of such chart creation tools.

It is with respect to these considerations and others that the disclosure made herein is presented.

SUMMARY

Techniques described herein that allows users of a chart creation tool to specify chart layouts interactively in lieu of programmatically specifying data transformations. Operatively, the herein described systems and methods can convert user-specified layouts into mathematical constraints, and a constraint solver is employed to draw the resulting chart. Other technical benefits not specifically mentioned herein can also be realized through implementations of the disclosed subject matter.

In order to realize the technical benefits mentioned briefly above, illustratively the herein described systems and methods provide for an exemplary user interface having illustrative controls that allow for the input of various commands through various user interface modalities including but not limited to drop down selection boxes, input fields, radio buttons, interactive windows allowing for the manipulation of a control through drag, stretch, and pull input interface commands.

In an illustrative operation, the illustrative user interface allows for a user to input data representative of one or more chart layouts through the interaction with one or more illustrative controls of the user interface. Responsive to such interactions, one or more mathematical constraints can be calculated/generated from the inputted user-specified one or more chart layout input data. In an illustrative implementation, the mathematical constraints can include various scope levels but are not limited to individual glyphs, within a chart, and between charts. The mathematical constraints can be then operatively solved to create solutions that are illustratively presented as data for display representative of a desired chart layout.

In the illustrative implementation, the mathematical constraints can be calculated on-the-fly by invoking one or more available selected commands or controls provided in the illustrative user interface. The illustrative user interface, can operatively separate mark and/or glyph editing from chart editing by providing two distinct editors operable to manipulate data for presentation in the chart.

In another illustrative implementation, a two-stage layout solver can be utilized that operatively can execute a secondary constraint solver subsequent to the execution of a linear constraint solver—i.e., to support non-linear chart layouts. Operatively, by way of example a linear solver can be used to compute the central position of a packing layout and, then, subsequently, a force-directed layout algorithm can be utilized to perform the packing layout at a desired location.

Illustratively, the herein described systems and methods can enable chart authors to directly manipulate layout parameters such as anchors, margins, and gaps. Often, a layout can be specified as a combination of partial specifications that can be operatively constructed through one or more user interactions with a chart authoring user interface.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques that allows users of a chart creation tool to specify chart layouts interactively in lieu of programmatically specifying data transformations. Operatively, the herein described systems and methods can convert user-specified layouts into mathematical constraints, and a constraint solver is employed to draw the resulting chart. Other technical benefits not specifically mentioned herein can also be realized through implementations of the disclosed subject matter.

In order to realize the technical benefits mentioned briefly above, illustratively the herein described systems and methods provide for an exemplary user interface having illustrative controls that allow for the input of various commands through various user interface modalities including but not limited to drop down selection boxes, input fields, radio buttons, interactive windows allowing for the manipulation of a control through drag, stretch, and pull input interface commands.

In an illustrative operation, the illustrative user interface allows for a user to input data representative of one or more chart layouts through the interaction with one or more illustrative controls of the user interface. Responsive to such interactions, one or more mathematical constraints can be calculated/generated from the inputted user-specified one or more chart layout input data. In an illustrative implementation, the mathematical constraints can include various scope levels but are not limited to individual glyphs, within a chart, and between charts. The mathematical constraints can be then operatively solved to create solutions that are illustratively presented as data for display representative of a desired chart layout.

In the illustrative implementation, the mathematical constraints can be calculated on-the-fly by invoking one or more available selected commands or controls provided in the illustrative user interface. The illustrative user interface, can operatively separate mark and/or glyph editing from chart editing by providing two distinct editors operable to manipulate data for presentation in the chart.

In another illustrative implementation, a two-stage layout solver can be utilized that operatively can execute a secondary constraint solver subsequent to the execution of a linear constraint solver—i.e., to support non-linear chart layouts. Operatively, by way of example a linear solver can be used to compute the central position of a packing layout and, then, subsequently, a force-directed layout algorithm can be utilized to perform the packing layout at a desired location.

Illustratively, the herein described systems and methods can enable chart authors to directly manipulate layout parameters such as anchors, margins, and gaps. Often, a layout can be specified as a combination of partial specifications that can be operatively represented as one or more concise set of menus and panels contained therein one or more options for layout manipulation.

Chart Creation Background:

The herein described systems and methods are further described using the following terms as follows. It is appreciated that although a meaning is provided to such terms, that such meaning is not limited in any manner and should be given meaning as by one of ordinary skill in the art.

Marks can be considered as primitive graphical elements, such as rectangle, ellipses, polygons, lines, and text spans. The attributes of a mark, such as its width, height, size, and color can be specified explicitly or mapped from data according to inferred quantitative, ordinal, or nominal scales.

Glyphs can be considered as a set of marks with a layout relationship between them. For example, a glyph can be just a single rectangle, or two rectangles that are adjacent to one another.

Links can be considered as visual elements between glyphs to emphasize their connectivity, typically realized as lines or bands.

Figure 1:
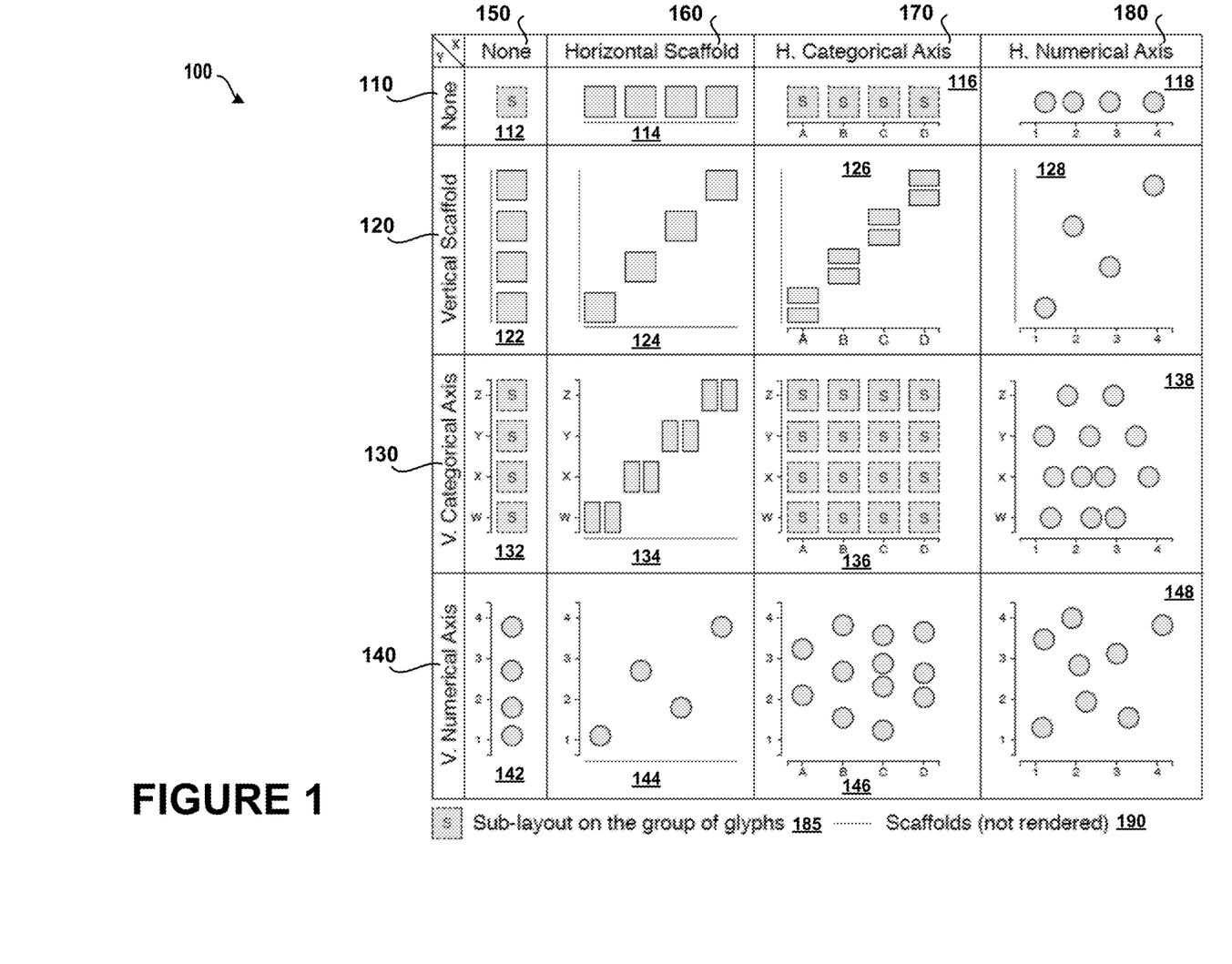
FIG. 1 illustrates various data organizations available for a chart layout according to the herein described systems and methods.

Scaffolds can operatively position glyphs according to geometrical constraints, as described in FIG. 1. For example, a horizontal scaffold can operatively position glyphs adjacent to one another horizontally. It is also possible to map a data dimension to a scaffold, at which point it becomes an axis and can position glyphs according to their value along this axis. Two scaffolds can be operatively combined to produce 2-dimensional layouts such as those associated with waterfall charts, scatterplots, and polar coordinate charts.

Plot Segments can be considered as sets of glyphs positioned according to one or two scaffolds. Each plot segment can impose its own layout on its constituent glyphs.

Legends can be defined as visual mappings from data to marks and glyphs and are visual elements in their own right, typically displayed adjacent to the plot segment(s) that incorporate these mappings.

Guides can be helpful visual indicators used for aligning marks within a glyph or aligning plot segments within a chart. Unlike scaffolds, guides can be operatively agnostic to the underlying data and thus are not used to position glyphs within a plot segment.

A Chart can be considered as a canvas area containing one or more chart elements, which is an umbrella concept for plot segments, guides, legends, glyphs, and marks. However, chart-level marks and the marks appearing in glyphs can be considered as different types of marks such that marks appearing in glyphs can be operatively be data-bound, while the chart-level marks may not be bound to data and can be placed freely on a chart rendering chart-level marks as chart annotations.

Guide Coordinators can add multiple equally spaced guides to a glyph or chart, which can be helpful for symmetrically laying out many marks within glyphs or many plot segments within charts, respectively.

FIG. 1 depicts the use of various scaffolds in an exemplary chart layout 100. As is shown the scaffolds can be categorized according to various classifications including but not limited to the no scaffold 110, vertical scaffold 120, vertical categorical axis 130, and vertical numerical axis 140. Further as is shown, each of the scaffolds 110, 120, 130, and 140 can be positioned according to a horizontal orientation such as no scaffold 150, horizontal scaffold 160, horizontal categorical axis 170, and horizontal numerical axis 180. As is shown, a number of scaffolding combinations can result in applying the various horizontal and vertical scaffold types inclusive but not limited to combinations 112, 114, 116, 118, 122, 124, 126, 128, 132, 134, 136, 138, 142, 144, 146, and 148. The combinations can have a scaffold 190 and/or a sub-layout on the group of glyphs in the layout 185.

Illustratively, the layout of a plot segment can be determined by its scaffolds and axes, and further determined by sub-layout options, if applicable. A plot segment can maintain two independent layout directions. By way of example, the terms that can be used for these directions can depend on the plot segment's coordinate system: "X" (or "Horizontal") and "Y" (or "Vertical") for Cartesian coordinates, "Angular" and "Radial" for Polar coordinates, and "Tangent" and "Normal" for coordinates along custom curves. Operatively, mark shapes of the layout can be morphed in non-Cartesian systems.

Illustratively, the X and Y direction of a plot segment can be assigned as a scaffold, a categorical axis, or a numerical axis. While a scaffold can stack glyphs according to its shape and orientation, a categorical axis can group the glyphs according to their categories to place them with even spacing along the axis, and a numerical axis positions the glyphs based on the data values. The combination of these options produces a layout of the glyphs within the plot segment.

It is appreciated that although the scaffolds 110, 120, 130, 140, 150, 160, 170, and 180 (and their ensuing combinations 112, 114, 116, 118, 122, 124, 126, 128, 132, 134, 136, 138, 142, 144, 146, and 148) are shown to have four data elements, that such number of data elements is merely illustrative as the inventive concepts contemplate the use of various data elements and not exclusive to four data elements.

Figure 2:
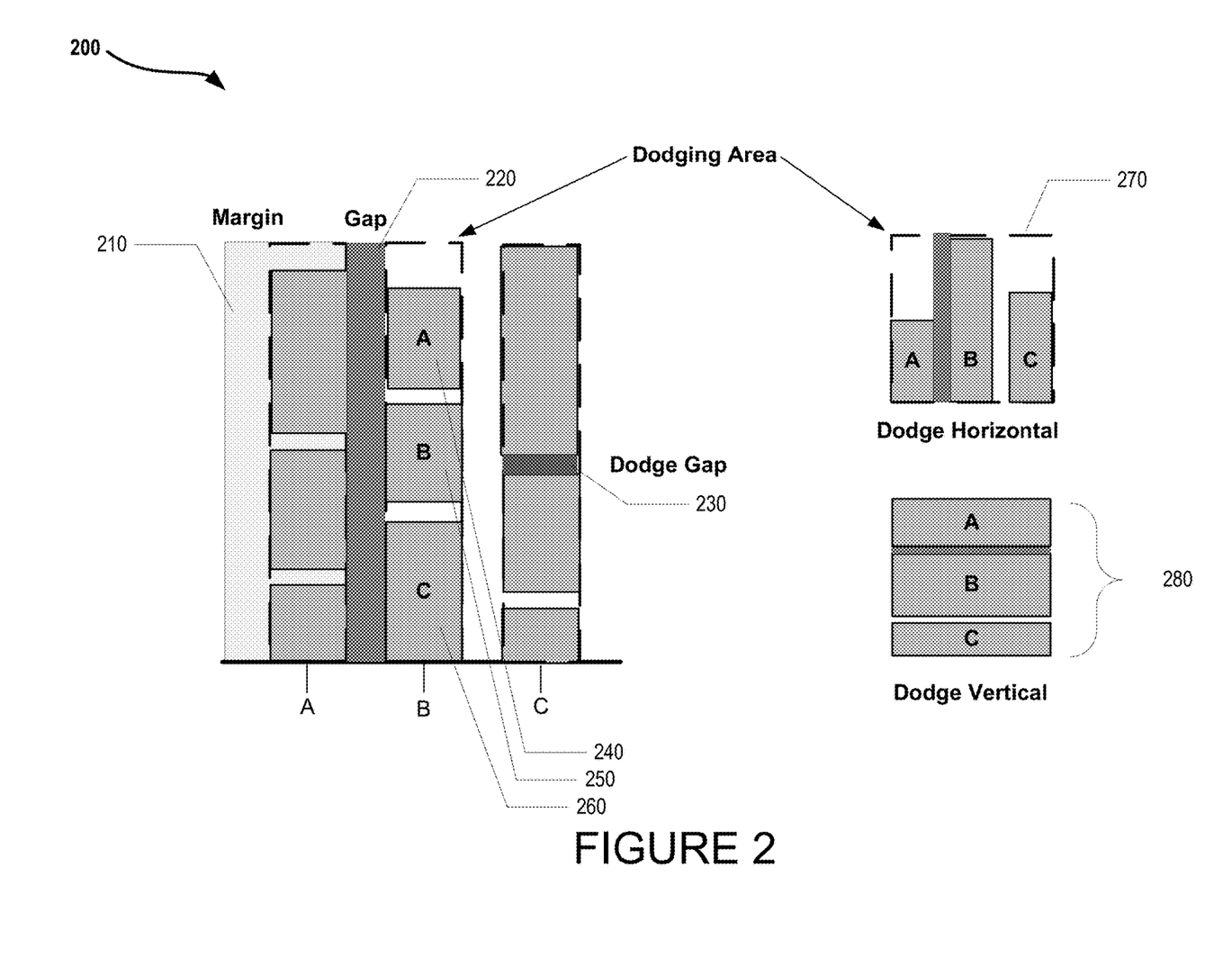
FIG. 2 illustrates other various data organizations available for a chart layout according to the herein described systems and methods.
Figure 3:
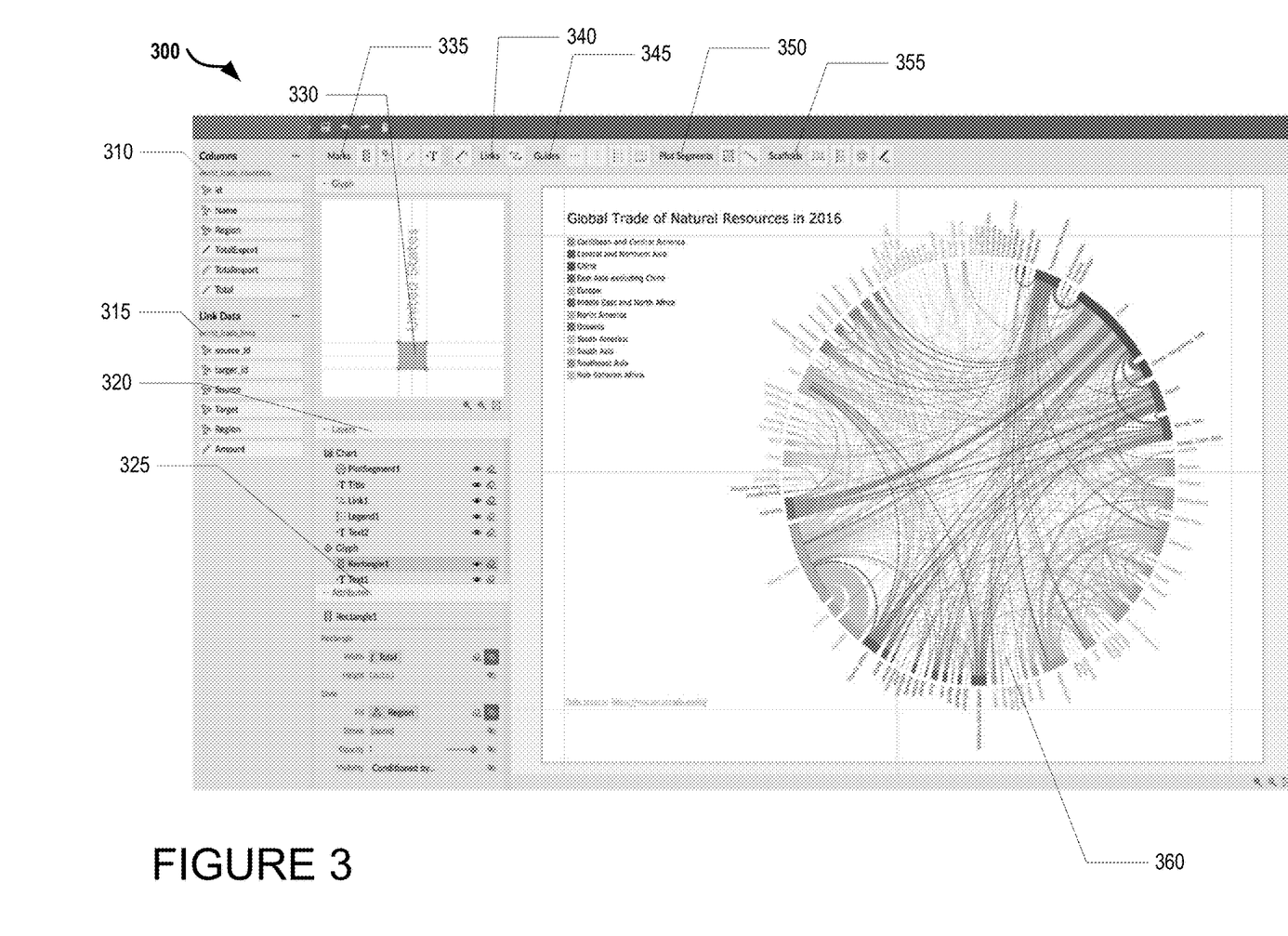
FIG. 3 illustrates an illustrative user interface operable to received user interactions in accordance with the herein described systems and methods.

FIG. 2 depicts operative layout 200 wherein the direct manipulation of gaps 220 between dodged glyphs 240, 250, and 260, as well as between glyphs 270 positioned along a categorical axis. Direct manipulation hints on gaps upon mouseover (i.e., of an exemplary user interface 300) can be provided allowing a chart author to shrink or grow gaps 220 via dragging (i.e., through a user input control—not shown) of the gaps 220 to manipulate dodge horizontal 270 or dodge vertical 280 glyph positioning.

FIG. 3 depicts illustrative user interface 300, which can consist of the dataset panels 310 and 315, layers editor 320, attributes editor 325, and the chart editor 360. The attribute editor 325 can operatively be contextual, showing the attributes for the current selection in the layers editor 320 or chart editor 360. The layers editor 320 can operatively allow a chart author to map data dimensions to marks and can operatively compose glyphs by specifying the positional relationships between marks.

Further, as is shown in FIG. 3, the data set panel can comprise various controls 335, 340, 345, 350, and 355 that allow a participating user (author) (not shown) to perform one or more data management operations on exemplary input data 3. Further as is shown, glyph editor 310 an include a number of control items including but not limited to "add text" control 325. Similarly, chart editor 320 can include a number of controls such as scaffold control 360 and links control 365.

Further, exemplary user interface 300 can provide for a drop zone 330 that can operatively allow a user to manipulate one or more contexts of the layout. In an illustrative implementation, automatic scale inference and scale sharing can be performed to support drag-and-drop data mapping. However, scales do not necessarily have a predetermined scaling parameter. The parameter can depend upon the chart and plot segment that will contain the mark or its parent glyph. For example, the height of a bar chart can constrain the height of the bar with the maximum value and can thereby impose a scaling factor on the other bars relative to the tallest bar. In another illustrative implementation, a horizontally stacked chart that can constrain the sum of its contained glyphs' widths to its own width can be provided, thereby imposing a scaling parameter relative to the width divided by the sum of the data values.

As glyphs can contain multiple marks, the intra-glyph positional relationships between marks can be specified. Absolute positioning and, more importantly, relative positioning van be performed. Operatively, snapping two marks together can create a constraint that enforces the corresponding attributes to be equal. In an illustrative implementation, to avoid making overcomplicating intra-glyph constraints, a hierarchy of snapping can be maintained such that: if mark A is snapped to mark B, snapping B to something else can also change A, whereas snapping A to something else can remove the snapping constraint, leaving B untouched.

The chart editor 320 can operatively allow a chart author to specify chart-level elements, including but not limited to plot segments, links, legends, guides, and chart-level marks. In an illustrative implementation, scaffolds can be added to the plot segment by two means: (1) dragging a scaffold icon on to the chart canvas, which can create a scaffold without any data mapping, one that can constrain glyphs to the scaffold's layout. For example, using a horizontal scaffold will create a horizontal layout, suitable for creating bar charts. Glyphs can appear equally spaced along this scaffold, drawn in the order that they appear in the data; and (2) dragging a data dimension from the data panel to the drop zone which can be considered a desired location in the glyph editor, the chart canvas, or the attribute panel. This action can also create a scaffold and additionally can draw an axis along this scaffold mapped to the data dimension.

If dragged over an existing scaffold, the scaffold can become mapped to the data dimension and an axis is drawn. Since constraints imposed by scaffolds can be independent of one another, scaffolds can be combined to create 2-dimensional layouts, such as those required by cartesian and polar coordinate systems.

When a scaffold becomes an axis, it is typical for multiple glyphs to share values along this axis. To avoid overdrawing glyphs at this points along an axis, there are several known approaches, including stacking and packing (or jittering). In an illustrative implementation, additional layout options to the author can be presented, invoked whenever the scaffold positions multiple glyphs at the same location. For example, a scatterplot with two categorical axes can inevitably position glyphs with the same X and Y attribute values at the same position. Operatively, the chart author can decide how to visually separate these glyphs via horizontal dodging, vertical dodging, or circle packing.

In an illustrative implementation, a number of types of links can be used for displaying connections between data items that can include but are not limited to: (1) links through a data series; (2) links connecting data items on multiple plot segments and/or (3) links from a separate data table. Operatively, links can be anchored on glyphs, and can take the form of lines or bands. The shape of links can be straight or curved (e.g., Bezier curve, arc). In an illustrative implementation, a chart specification can be utilized to define a chart independent of the underlying data, however, the chart specification can still refer to data dimension names from the data schema. In the chart specification, scales, glyphs, chart elements, and positional constraints can be stored between chart elements as objects, which have a fixed or variable set of attributes. Each attribute can be specified either as a given value, a data mapping from a data dimension via a scale, or equal to some attribute of the upper-level object.

In an illustrative implementation, a chart state can be an instantiation of the chart specification for a given dataset, storing object attribute values. The most notable aspect is the mapping from data rows to glyph states. In the chart specification, glyphs can be specified as prototypes, whereas in the state, each data row can have its own glyph state. This is because a single data row can be mapped to multiple glyphs across multiple plot segments, and the attributes of these glyphs can differ. Illustratively, both chart specification and chart state can be implemented as java script object notation (JSON) objects, which allows for easy serialization and deserialization. Consequently, undo/redo and save/load features can be more easily implemented.

In an illustrative implementation, a constraint solver component can be utilized and can be responsible for generating mathematical constraints from the chart specification and executing a constraint solving algorithm to find the solution. Since there are chart-level elements such as plot segments, legends, and guides, glyph-level elements including marks and glyph anchors, as well as scale objects, constraints can be generated at multiple levels.

In an illustrative implementation, the mathematical constraint solver can be a linear solver which is fast and has guaranteed convergence. However, many possible charts, such as those incorporating a packing layout or force-directed layout, can only be expressed via nonlinear constraints. A two-stage constraint solving mechanism can be operatively utilized for such nonlinear constraints. In the first stage, the linear constraint solver can be utilized to determine the layout of the chart elements and a basic mapping for stacking-based layouts, which can be expressed via linear constraints. Additional layout algorithms can then be utilized to deal with nonlinear layouts. The first stage can generate additional variables for the second stage to use; for example, the first stage can determine the center point for each group in the packing layout.

In an illustrative implementation, the chart layout created by exemplary user interface 300 can comprise a reusable template that operatively can be stored on a computing environment. In an illustrative operation, the stored reusable templates can be retrieved for additional interaction in the exemplary user interface 300 to allow for efficient creation of a desired chart. In the illustrative implementation, the exemplary reusable templates can also be communicated to other computing applications in a format that can be processed by the other computing applications for the efficient creation of a desired chart.

Figure 4:
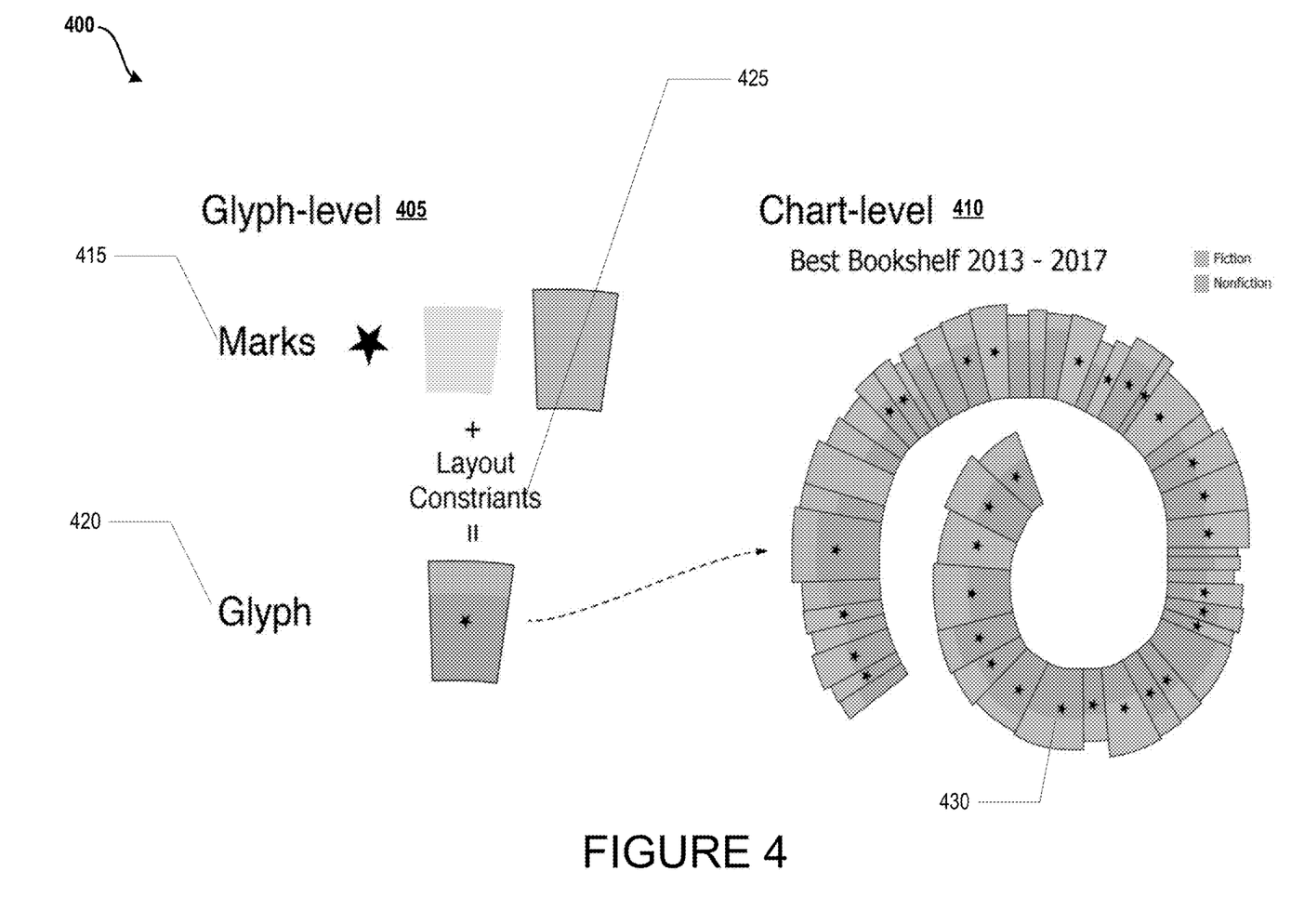
FIG. 4 illustrates an exemplary chart layout in accordance with the herein described systems and methods.

FIG. 4 depicts an exemplary chart 410 representing the best bookshelf visualization that can be operatively created by the exemplary user interface 300 of FIG. 3. As is shown at the Glyph level 405, glyph 420 can be considered as a set of one or more marks 415 with one or more layout constraints applied. At the Chart level 410, the chart can be considered various glyphs 420 having therein applied one or more layout constraints 425. Illustratively, exemplary chart 410 can use three marks to compose the glyph: a star symbol and two rectangles. The glyphs can be laid out by the plot segment with a horizontal scaffold and a custom curve coordinate system. The coordinate system can morph the glyphs into wedge-like shapes. Illustratively, the chart can contain a text mark for the chart title, and a legend showing the color scale.

Figure 5:
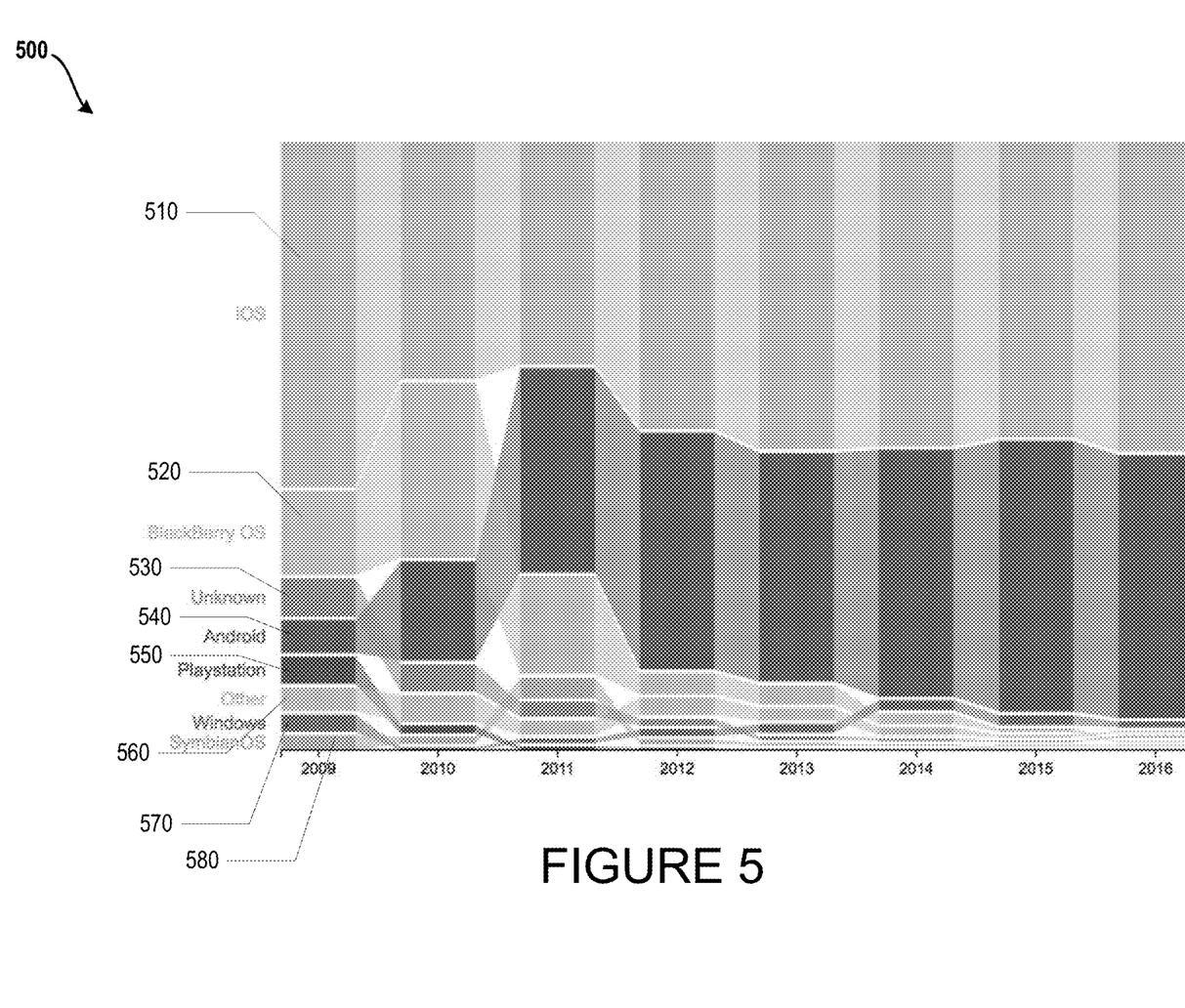
FIG. 5 illustrates another exemplary chart layout in accordance with the herein described systems and methods.

FIG. 5, shows chart 500 that can operatively depict mobile operating system market share data in Europe spanning several years. The input data is presented as a table of three dimension: Year, Operating System, and Share. Each combination of operating system and year can be represented as a row in the table, with the corresponding share percentage value. The chart design, as shown in FIG. 5, aims to convey the trend of market share for each operating system, as well as the ranking of market share on each year. Each operating system is represented as a series of linked bars with a color 510, 520, 530, 540, 550, 560, and 570. The height of a bar can represent the market share for the corresponding year and operating system. For each year, the bars can be ordered by decreasing market share values from top to bottom. From the chart we can see that iOS dominates the market, and that Android grew rapidly from 2009 to 2012 and eventually achieved a share similar to that of iOS. Although Windows's share is still small, its rank is gradually surpassing those of other operating systems.

Figure 6:
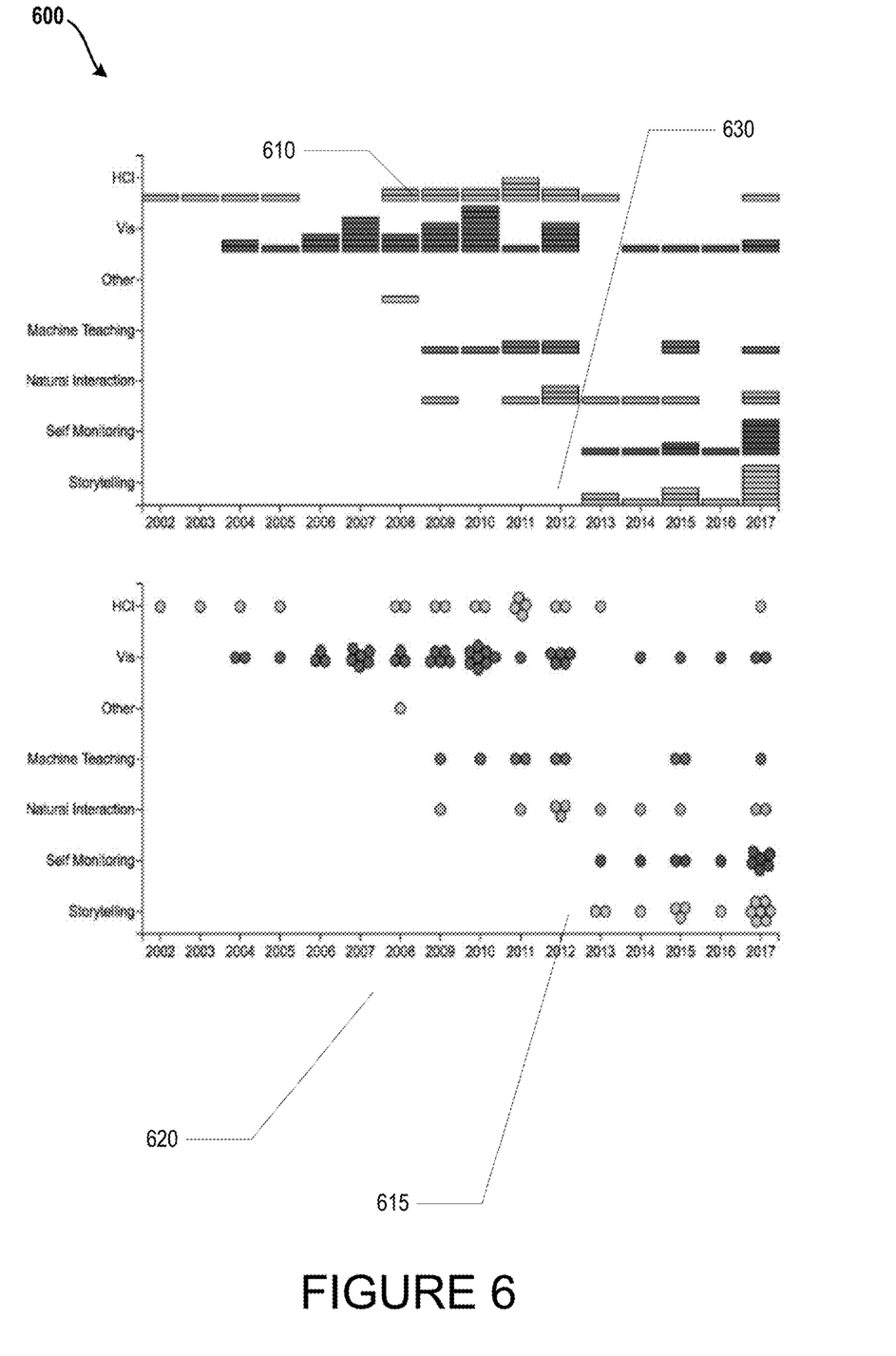
FIG. 6 illustrates the transformation from one exemplary chart layout to another exemplary chart layout both operating on the same input data in accordance with the herein described systems and methods.

FIG. 6 depicts two charts 610 and 620 showing an exemplary researcher's publications by year and category. The publications are shown as dodged rectangles in the chart 610, and as packed circles in chart 620. Chart 610 shows the publications as rectangles 630 grouped horizontally by Year and vertically by Research Area. According to chart 610, the glyph design is simply a color-coded rectangle. The rectangle can be added by dragging it into the glyph editor 310 of FIG. 3, and the Research Area dimension can be mapped to its fill color. Next, the dimensions Year and Research Area can be mapped to the X axis and the Y axis respectively by dragging the dimensions from the dataset panel 315 of FIG. 3 to the corresponding axis in the charting area. Horizontal dodging can be used to spread the rectangles with the same Year and Research Area. To achieve chart 610, we select the plot segment and change the dodging option to vertical.

To convert the chart 610 to the second chart 620, the rectangle mark can be removed from the glyph editor 310 of FIG. 3 and a new circle mark can be added instead. The Research Area dimension can then be mapped to the circle mark to maintain the color mapping. Finally, the dodging option to "packing" to achieve the packed circles 615 layout.

Figure 7:
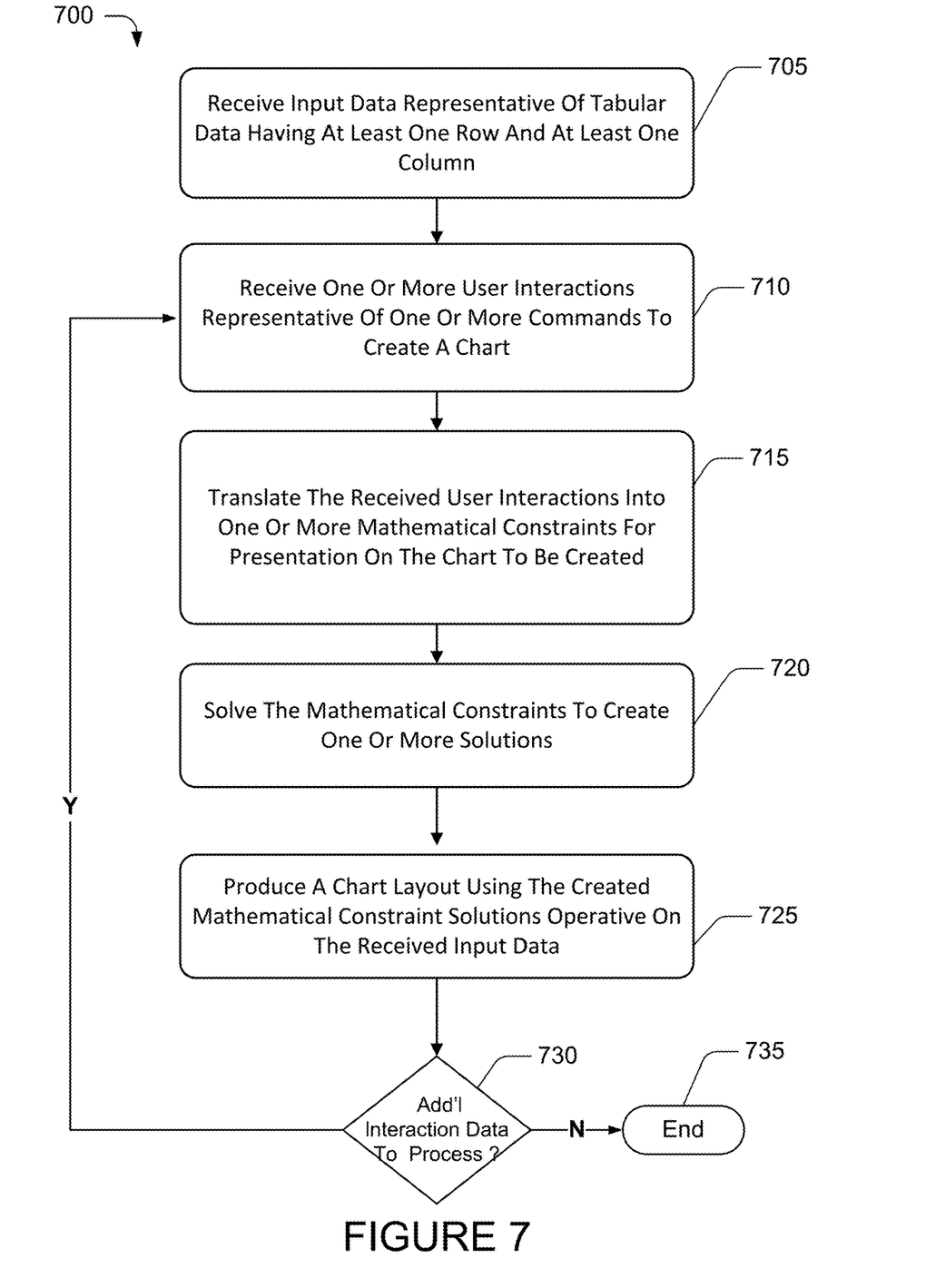
FIG. 7 is a flow diagram of an illustrative process to enable a standard user to modify one or more application management settings to generate a custom security policy from a managed account.

FIG. 7 is a flow diagram of an illustrative process 700 for the creation of a bespoke chart through layout interaction with an exemplary computing environment. As is shown, processing begins at block 705 where input data representative of tabular data having at least one row and one column is received. Processing proceeds to block 710 where one or more interactions representative of one or more commands to create a chart is received. The received interactions is then translated at block 715 into one or more mathematical constraints. The one or more mathematical constraints are then solved at block 720. A chart layout is then produced using the created mathematical constraint solutions operative on the received input data at block 725.

Processing then proceed to block 730 where a check is performed to determine if there is additional user interaction that requires processing. If there is no additional data, processing terminated at block 735. If additional user interaction requires processing, processing reverts to block 710 and proceeds from there.

Figure 8:
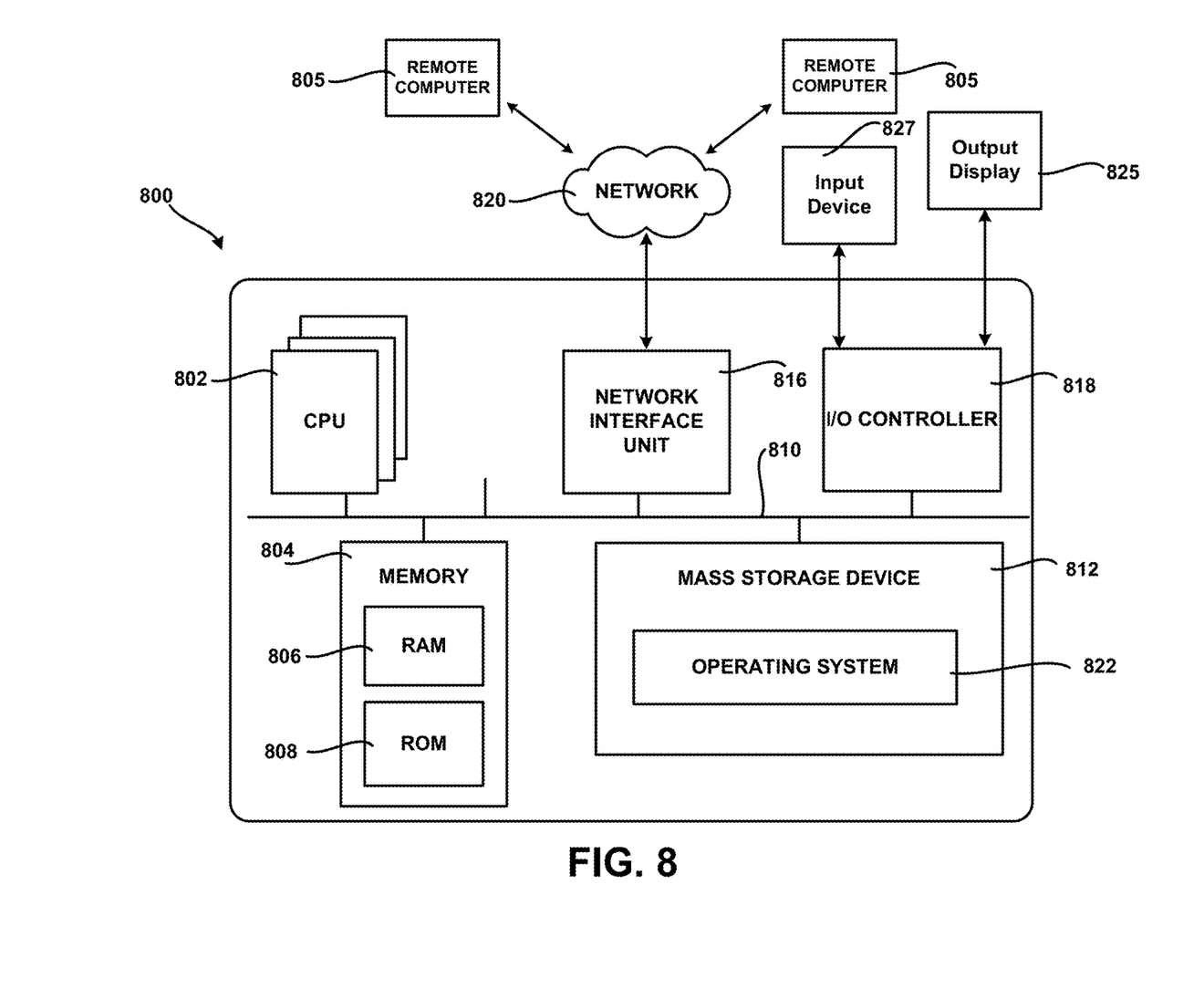
FIG. 8 is a computer architecture diagram showing an illustrative computer hardware and software architecture for a computing device that can operate to generate the bespoke chart and/or layouts, according to one embodiment.

FIG. 8 is a computer architecture diagram showing an illustrative computer hardware and software architecture for a computing device that can operatively execute as described by the herein described systems and methods. In particular, the architecture illustrated in FIG. 9 can be utilized to implement a server computer, mobile phone, an e-reader, a smartphone, a desktop computer, an AR/VR device, a tablet computer, a laptop computer, or another type of computing device.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs, and other types of programs. The mass storage device 812 can also be configured to store other types of programs and data.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices 827, including a keyboard, mouse, touch input, an electronic stylus (not shown in FIG. 8), or a physical sensor such as a video camera. Similarly, the input/output controller 818 can provide output to a display screen or other type of output device 825.

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
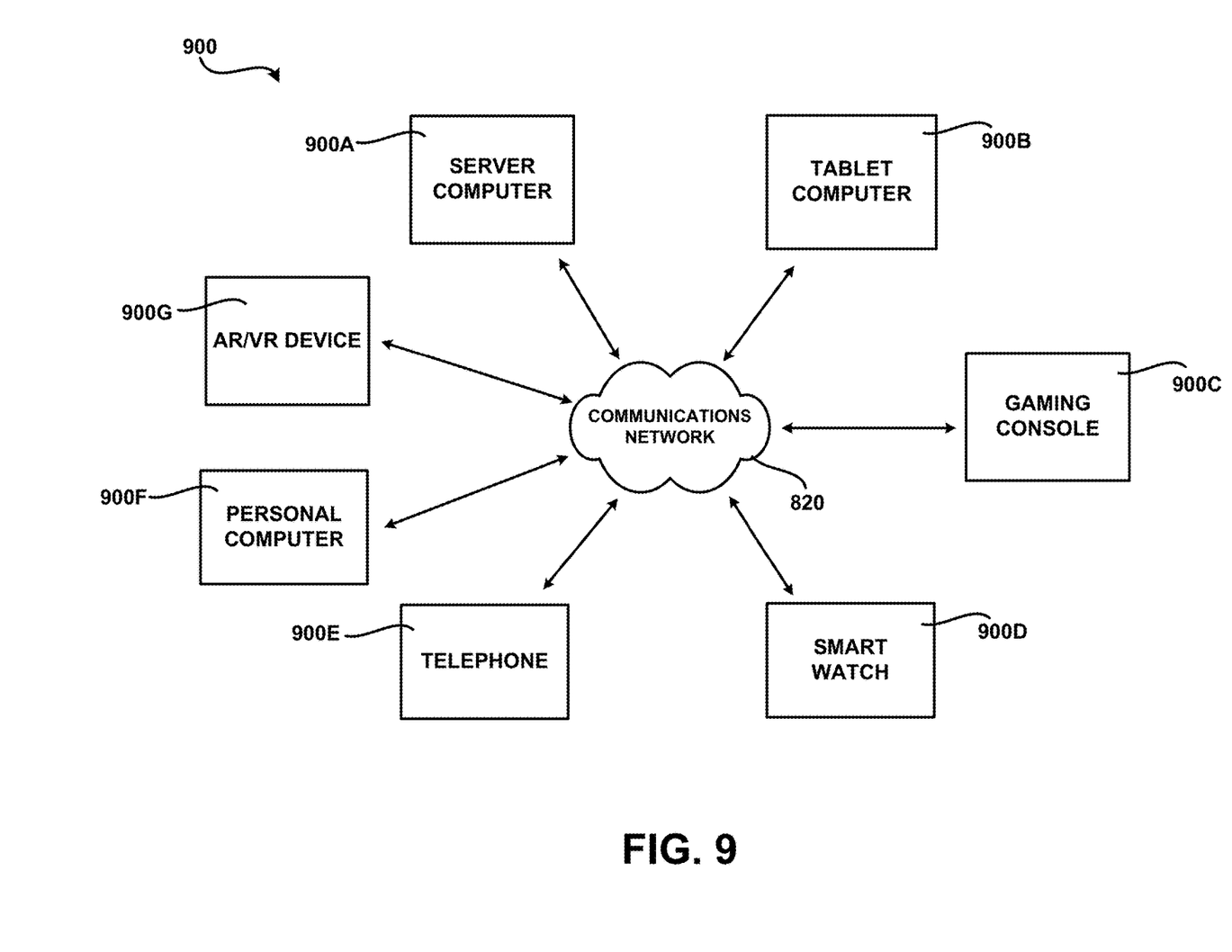
FIG. 9 is a network diagram illustrating a distributed computing environment in which aspects of the disclosed technologies can be implemented, according to various embodiments presented herein.

FIG. 9 is a network diagram illustrating a distributed network computing environment 900 in which aspects of the disclosed technologies can be implemented, according to various embodiments presented herein. As shown in FIG. 9, one or more server computers 900A can be interconnected via a communications network \*20 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 900B, a gaming console 900C, a smart watch 900D, a telephone 900E, such as a smartphone, a personal computer 900F, and an AR/VR device 900G.

In a network environment in which the communications network \*20 is the Internet, for example, the server computer 900A can be a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the client computing devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a client computing device 900B-900G to obtain desired data and/or perform other computing applications.

The data and/or computing applications may be stored on the server 900A, or servers 900A, and communicated to cooperating users through the client computing devices 900B-900G over an exemplary communications network 820. A participating user (not shown in FIG. 9) may request access to specific data and applications housed in whole or in part on the server computer 900A. These data may be communicated between the client computing devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

EXAMPLE CLAUSES

The disclosure presented herein may be considered in view of the following clauses.

Example Clause A, a system for the creation of a bespoke chart on a computing environment, the system comprising: at least one processor; at least one memory component; and at least one memory in communication with the at least one processor, the at least one memory having computer-readable instructions stored thereupon that, when executed by the at least one processor, cause the at least one processor to: receive input data representative of tabular data having at least one row and one column; receive one or more user interactions representative of one or more instructions to create a chart through a cooperating user interface; translate the received user interactions into one or more mathematical constraints; solve the one or more mathematical constraints to generate one or more solutions; and create a chart layout (400, 500, 600) using the generated one or more solutions.

Example Claus B, the system of Example Clause A, wherein the computer-readable instructions further cause the at least one processor to display the created chart on a cooperating output display.

Example Clause C, the system of Example Clauses A and B, wherein the computer-readable instructions further cause the at least one processor to create a chart layout comprising a reusable template.

Example Clause D, the system of Example Clauses A through C, wherein the computer-readable instructions further cause the at least one processor to translate on-the-fly, the received one or more user interactions with one or more controls of a cooperating chart creation user interface into the one or more mathematical constraints.

Example Clause E, the system of Example Clauses A through D, wherein the cooperating chart creation user interface comprises one or more controls operative to separate mark/glyph editing from chart editing.

Example Clause F, the system of Example Clauses A through E, wherein instructions are inputted by a participating user using one more input devices, the input devices operative to allow a user to drag elements between portions of a created chart to generate one or more chart links.

Example Clause G, the system of Example Clause A through F, further comprising a two-stage layout solver operable to perform linear and non-linear solutions to the one or more mathematical constraints.

Example Clause H, a computer-implemented method, comprising: receiving input data representative of tabular data having at least one row and one column; receiving one or more user interactions representative of one or more instructions to create a chart; translating the received user interactions into one or more mathematical constraints; solving the one or more mathematical constraints to generate one or more solutions; creating a chart layout using the generated one or more solutions, the created chart layout comprising a reusable template; and displaying the created chart on a cooperating output display.

Example Clause I, the computer-implemented method of Example Clause H, further comprising receiving one or more mathematical constraints comprising scope levels comprising individual glyphs, within a chart, and between charts.

Example Clause J, the computer-implemented method of Example Clauses H and I, further comprising translating the received one or more user interactions on-the-fly responsive to an instruction originating from the execution of one or more controls in a cooperating chart creation user interface Example Clause K, the computer-implemented method of Example Clauses H through J, further comprising separately editing mark/glyph data from chart data within a cooperating user interface operable to receive one or more user interactions.

Example Clause L, the computer-implemented method of Example Clauses H through K, further comprising inputting the one or more user interactions using one or more input devices, the input devices operative to allow a user to drag elements between portions of a created chart within the cooperating user interface.

Example Clause M, the computer-implemented method of Example Clauses H through L, further comprising generating one or more links between the one or more elements of the portions of a created chart.

Example Clause N, the computer-implemented method of Example Clauses H through M, further comprising generating one or more linear solutions for the one or more mathematical constraints.

Example Clause O, the computer-implemented method of claim 13, further comprising generating one or more non-linear solutions for the one or more mathematical constraints.

Example Clause P, a computer-readable storage medium having computer-executable instructions stored thereupon which, when executed by one or more processors of a computing device, cause the one or more processors of the computing device to receive input data representative of tabular data having at least one row and one column; receive one or more user interactions representative of one or more instructions to create a chart; translate the received user interactions into one or more mathematical constraints; solve the one or more mathematical constraints to generate one or more solutions; and create a chart layout using the generated one or more solutions, the created chart layout comprising a reusable template.

Example Clause Q, the computer-readable storage medium of Example Clause P, wherein the instructions further cause the one or more processors of the computing device to display the created chart on a cooperating output display.

Example Clause R, the computer-readable storage medium of Example Clauses P and Q, wherein the instructions further cause the one or more processors of the computing device to: receive one or more mathematical constraints comprising scope levels comprising individual glyphs, within a chart, and between charts.

Example Clause S, the computer-readable storage medium of Example Clauses P through R, wherein the instructions further cause the one or more processors of the computing device to: input the one or more user interactions using one or more input devices, the input devices operative to allow a user to drag elements between portions of a created chart within the cooperating user interface.

Example Clause T, the computer-readable storage medium of Example Clauses P through S, wherein the instructions further cause the one or more processors of the computing device to: to generate the one or more solutions comprising linear and non-linear solutions to the one or more mathematical constraints.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for the creation of a bespoke chart on a computing environment, the system comprising:
    at least one processor;
    at least one memory component; and
    at least one memory in communication with the at least one processor, the at least one memory having computer-readable instructions stored thereupon that, when executed by the at least one processor, cause the at least one processor to:
    receive input data representative of tabular data having at least one row and one column;
    receive one or more user interactions, associated with the tabular data, to create a chart through a cooperating user interface;
    translate the received user interactions into one or more mathematical constraints;
    solve the one or more mathematical constraints to generate one or more solutions comprising at least a two-stage layout solver operable to perform linear or non-linear solutions to the one or more mathematical constraints; and
    create a chart layout using the generated one or more solutions.

2. The system of claim 1, wherein the computer-readable instructions further cause the at least one processor to display the created chart on a cooperating output display.

3. The system of claim 1, wherein the computer-readable instructions further cause the at least one processor to create a chart layout comprising a reusable template.

4. The system of claim 3, wherein the computer-readable instructions further cause at least one processor to translate on-the-fly, the received one or more user interactions with one or more controls of a cooperating chart creation user interface into the one or more mathematical constraints.

5. The system of claim 4, wherein the cooperating chart creation user interface comprises one or more controls operative to separate mark/glyph editing from chart editing.

6. The system of claim 5, wherein instructions are inputted by a participating user using one more input devices, the input devices operative to allow a user to drag elements between portions of a created chart to generate one or more chart links.

7. A computer-implemented method, comprising:
receiving input data representative of tabular data having at least one row and one column;
receiving one or more user interactions, associated with the tabular data, to create a chart;
translating the received user interactions into one or more mathematical constraints, wherein the one or more mathematical constraints comprising scope levels comprising individual glyphs, within a chart, and between charts;
solving the one or more mathematical constraints to generate one or more solutions;
creating a chart layout using the generated one or more solutions, the created chart layout comprising a reusable template; and
displaying the created chart on a cooperating output display.

8. The computer-implemented method of claim 7, further comprising receiving one or more mathematical constraints comprising scope levels comprising individual glyphs, within a chart, and between charts.

9. The computer-implemented method of claim 7, further comprising translating the received one or more user interactions on-the-fly responsive to an instruction originating from the execution of one or more controls in a cooperating chart creation user interface.

10. The computer-implemented method of claim 7, further comprising separately editing mark/glyph data from chart data within a cooperating user interface operable to receive one or more user interactions.

11. The computer-implemented method of claim 10, further comprising inputting the one or more user interactions using one or more input devices, the input devices operative to allow a user to drag elements between portions of a created chart within the cooperating user interface.

12. The computer-implemented method of claim 11, further comprising generating one or more links between the one or more elements of the portions of a created chart.

13. The computer-implemented method of claim 12, further comprising generating one or more non-linear solutions for the one or more mathematical constraints.

14. The computer-implemented method of claim 7, further comprising generating one or more linear solutions for the one or more mathematical constraints.

15. A computer-readable storage medium having computer-executable instructions stored thereupon which, when executed by one or more processors of a computing device, cause the one or more processors of the computing device to:
receive input data representative of tabular data having at least one row and one column;
receive one or more user interactions, associated with the tabular data, to create a chart;
translate the received user interactions into one or more mathematical constraints;
solve the one or more mathematical constraints to generate one or more solutions comprising at least a two-stage layout solver operable to perform linear or non-linear solutions to the one or more mathematical constraints; and
create a chart layout using the generated one or more solutions, the created chart layout comprising a reusable template.

16. The computer-readable storage medium of claim 15, wherein the instructions further cause the one or more processors of the computing device to:
display the created chart on a cooperating output display.

17. The computer-readable storage medium of claim 15, wherein the instructions further cause the one or more processors of the computing device to:
input the one or more user interactions using one or more input devices, the input devices operative to allow a user to drag elements between portions of a created chart within the cooperating user interface.

18. The computer-readable storage medium of claim 15, wherein the instructions further cause the one or more processors of the computing device to:
to generate the one or more solutions comprising linear and non-linear solutions to the one or more mathematical constraints.

* * * * *